June 25, 1940.  L. A. YOUNG  2,205,871
METHOD OF MAKING NUTS
Filed Oct. 18, 1937  2 Sheets-Sheet 1
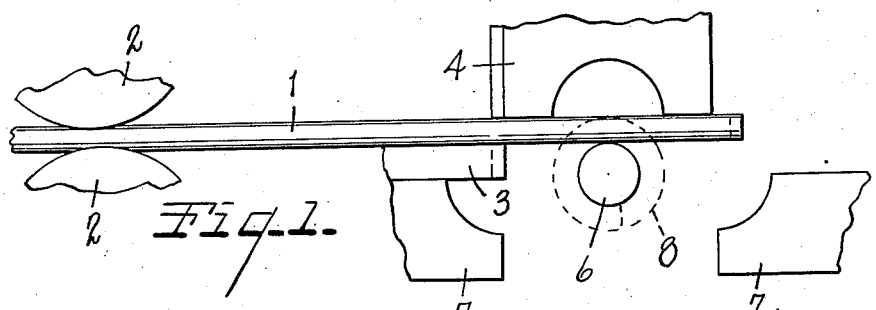
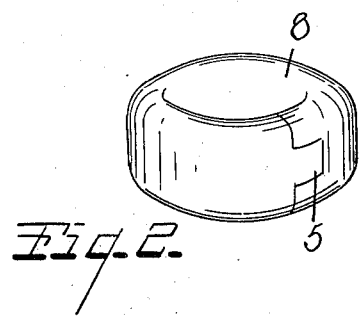
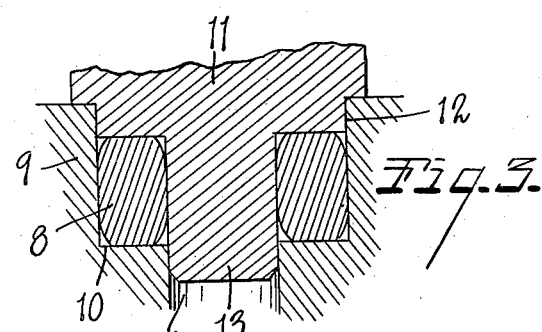
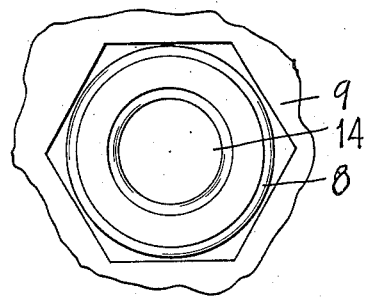
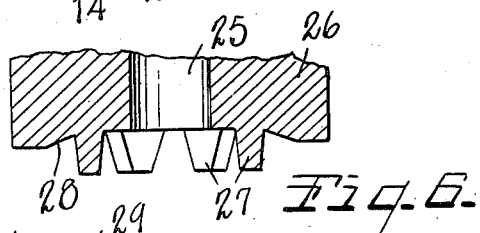
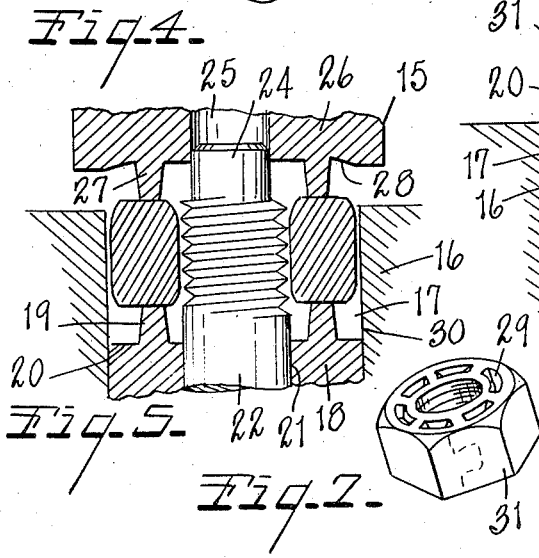
INVENTOR.
Leonard A. Young
BY Earl & Chappell
ATTORNEYS.

Patented June 25, 1940

2,205,871

UNITED STATES PATENT OFFICE 2,205,871

METHOD OF MAKING NUTS

Leonard A. Young, Detroit, Mich.

Application October 18, 1937, Serial No. 169,534

16 Claims. (Cl. 10—86)

This invention relates to improvements in method of making nuts.

The main objects of this invention are:

First, to provide an improved nut characterized by its lightness in weight and economy of material in the manufacture.

Second, to provide an improved nut having the metal thereof work hardened by the process of producing the same.

Third, to provide a novel and improved method of forming nuts from rod stock by bending, hammering and swaging operations.

Fourth, to provide a method of manufacturing nuts by hammering or swaging a blank in a die to cause the metal thereof to flow radially and assume the shape of the finished product, at the same time undergoing a considerable refining action.

Fifth, to provide a method of forming nuts by hammering or swaging operations alone, eliminating all metal removing machine steps.

Sixth, to provide a method of the type described which is very effective in production of an improved nut yet which is highly practical, economical, and capable of being carried out speedily.

Seventh, to provide a machine for conveniently and speedily carrying out the method of the invention.

Further objects relating to details and economies of the invention will appear from the description to follow. The invention is defined in the claims.

The subject matter of this application is related to that of my copending application, Serial No. 171,353, filed October 27, 1937, and entitled Nuts and like machine elements and method of making. In that application, I disclose a product in the form of a nut and a process for producing the same by hammering and swaging an annular blank in a die to shape the same into polygonal form, simultaneously work hardening the metal and producing axially extending recesses serving to lighten the nut and effect decided economies in the material used therein. In the method of that case, the nuts as formed by the hammering and swaging steps are subsequently subjected to a machining or tapping operation to produce the threads therein. The present invention relates to the simultaneous production of the threads with the final swaging of the nut to finished form and the production of axially extending recesses therein. Obviously, such a method obviates the necessity for finish machining operations of any kind and it follows that nuts may be turned out in quantity production at very little cost, while the wastage of machining steps is entirely eliminated.

Structures embodying the features of the invention are illustrated in the accompanying drawings, wherein:

Fig. 1 is a conventionalized showing of a machine for performing certain steps of the method.

Fig. 2 is a perspective view of an annular ring-shaped blank of somewhat flattened stock as formed by the elements in Fig. 1 and prior to further forming operations undergone thereby.

Fig. 3 is a fragmentary view in vertical transverse section of a blank in operative relation to a die and hammer utilized in performing a preliminary shaping operation thereon.

Fig. 4 is a fragmentary plan view illustrating the shape of the die shown in Fig. 3 and the operative position of the blank therein.

Fig. 5 is a fragmentary view in vertical transverse section, illustrating the preliminarily shaped blank in operative position relative to a finish swaging or pressing die, and a thread matrix element mounted centrally in the die.

Fig. 6 is a fragmentary view in section similar to Fig. 5, illustrating the finished product in operative relation to the die, which is shown after the ejecting or stripping movement thereof.

Fig. 7 is a perspective view illustrating the finished nut.

Figure 8:
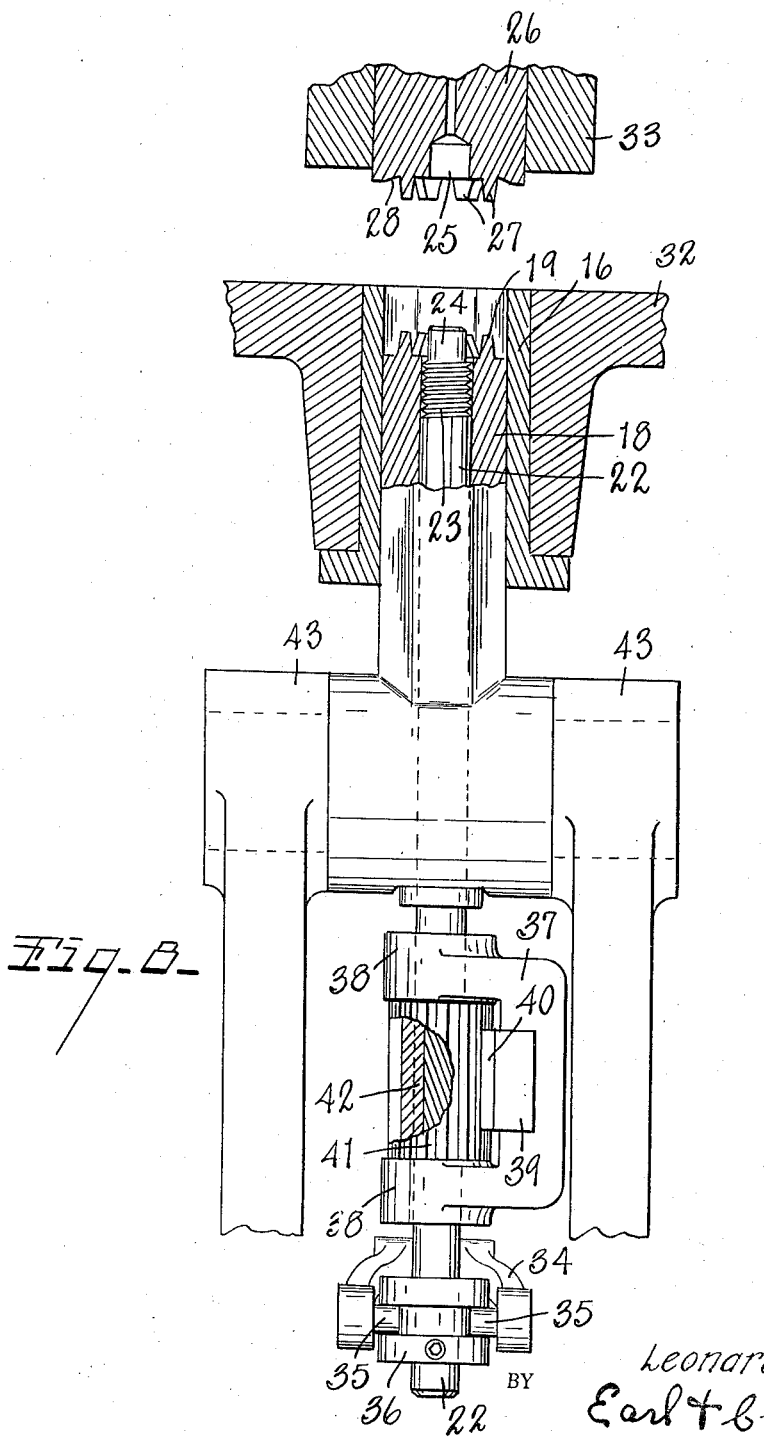
Fig. 8 is a fragmentary elevational view partially in section illustrating a machine for performing the method of the invention.

Referring to the drawings, reference numeral 1 generally indicates an elongated bar of rod stock of flattened section which is intermittently fed forwardly by feed rolls 2 over the edge of a cutting die 3 and beneath a reciprocating cutter and former member 4, the said cutter member and die being cooperative to sever lengths from the bar 1 and in addition being suitably formed to shape the ends of the severed length for a tongue and groove connection as indicated by the reference numeral 5 in Fig. 2, when the length is bent around a mandrel 6 as indicated in dotted lines in Fig. 1.

The bending referred to is performed in part by member 4 coacting with mandrel 6 and by the opposed reciprocable forming members 7 which are brought together by suitable mechanism (not shown) to complete the shaping of the length into the annular cylindrical or elongated blank illustrated in Fig. 2 and indicated by the reference numeral 8.

After being formed as described, the blank is placed in a preliminary forming die 9, of hexagonal shape as illustrated in Fig. 4, although the shape may be altered when it is desired to produce nuts of different outline. The die 9 has an annular shoulder 10 supporting the blank. A reciprocating hammer 11 coacts with the die, being provided with a reduced portion 12 corresponding in shape to and fitting within the die, and a guiding projection 13 registratble in a central bore 14 in the die. The blank is subjected to an initial preliminary hammering by the elements described whereby it is conformed roughly to a hexagonal or other shape due to the radial flowing of the metal or material of the blank. Thereafter, the partially formed element is transferred to a finish punching, pressing or swaging unit generally indicated by the reference numeral 15 wherein the final shaping and finishing steps are performed.

The said punching, pressing or swaging unit consists of a die 16 having a die chamber 17 corresponding in outline to the finished, i. e., exterior, shape of the nuts and the said chamber slidably receives a lower hollow or tubular punching or swaging member 18 provided with an annular series of upstanding recess-forming metal displacing projections 19 on its upper edge 20. The lower punch member 18 has a central cylindrical bore 21 slidably and rotatably receiving a thread forming member or mandrel 22. This mandrel has a matrix thread or threads 23 formed therein adjacent its upper end 24. The said upper end is receivable in an opening 25 in the top punching or swaging member 26 which, like member 18, is provided with an annular series of spaced projections 27 and is otherwise shaped at 28 to complete the shaping of the nut simultaneously with the pressing or swaging operation to be described.

In operation, the lower pressing member 18 is elevated to a position in die 16 for supporting the preliminarily shaped blank relative to the thread matrix 23 as illustrated in Fig. 5, the thread forming matrix being positioned adjacent and inside the work. The punch members 18, 26 are thereupon advanced preferably simultaneously toward one another, with the result that projections 19, 27 embed themselves into the work, forming axially extending recesses 29 therein and forcing the metal of the work to flow radially so as to shape itself externally against the formed walls 30 of die 16 and internally against matrix 23 so as to conform to the outline thereof and provide the internal threading required. Obviously the metal of the matrix should be of sufficient hardness so as to withstand stripping of the threads thereof or other deformation during the shaping operation. The degree of hardness will of course depend upon the character of the metal from which the nuts are made. It will be understood that due to the concentration of power at the relatively small work contacting surfaces of projections 19, 27 there is an enormous multiplication of power, sufficient to cause flowage of metal by a single pressing operation as described.

Moreover, a grain swaging or mashing action is exerted on the metal due both to the preliminary shaping hammering in the die 12 and to the working of the metal effected by swaging members 18, 26. The direction of the travel of the metal is mainly radial so that there is no stripping action on the matrix threads 23 and it will be apparent that the grains of the metal forming the threads on the nut are themselves considerably mashed by the thread forming process so that as a result the threads will be exceedingly hard and wear resistant by the attendant work hardening.

When the nut forming operation has been completed, the rod 22 is rotated by appropriate mechanisms such for example as hereinafter described so as to free the matrix threads 23 from the finished nut which is indicated by the reference numeral 31. Due to the elasticity of the metal the formed threads of the nut will "spring" a very slight distance away from the matrix, which allows the matrix to be easily turned relative to the nut. When the threads 23 and the nut have parted, the upper and lower punching or swaging members 27, 18, respectively, are elevated and the upper member separated from the nut as illustrated in Fig. 6, whereupon the nut may be stripped from the lower member.

Considering the fact that subsequent or further threading or tapping operations are entirely eliminated, it is apparent that the process of the invention is well adapted to large scale production of nuts and effects great economies of material and labor costs. The punches and dies described are obviously capable of being mounted in gangs to multiply production.

The punching or swaging operation also results in the distortion of the tongue and groove or mortise and tenon connection 5 to distort the metal thereof and securely key and interlock and weld the parts together whereby a permanent integral union at the ends of the blank 8 is assured. The effect of such distortion is indicated by dotted lines in Fig. 7. It will be observed that the annular spacing of the projections 19, 27 is such that at least one of the same engages the blank so as to overlap a substantial part of the joint 5, thus effecting a material working of the metal at the meeting faces of the same.

In Fig. 8, I illustrate conventionally an embodiment of a machine adapted to perform the process of the invention, the reference numeral 32 indicating a bed or table wherein the die 16 is mounted and the reference numeral 33 a guide for the reciprocating upper punching or swaging member 26. The rod 22 is raised and lowered by means of a switch shifter arm 34 actuated by mechanisms not shown, the said arm having oppositely disposed pins 35 cooperating with a grooved collar 36 secured to the rod 22 to vertically reciprocate the same.

Rotation of the rod 22 in order to remove the matrix threads 23 thereon from the threads formed in the nut thereby is effected in any desired manner. I have indicated a satisfactory arrangement for this purpose in the form of a yoke 37 having alined bosses 38 drilled to slidingly receive the rod 22, the said yoke 37 serving as a sliding support for a rack 39 having teeth 40 in mesh with a gear 41. The gear is drivingly connected to the rod 22 by a spline 42. By such means, the rod 22 is reciprocated or rotated, the timing of such movements being determined by appropriate mechanisms not shown. The lower punching or swaging member 18 is actuated vertically by power driven arms 43, being suitably trunnioned in the said arms. The upper punching or swaging member 26 is actuated vertically by any suitable mechanism.

I use the term "pressing", and "punching" referring to the thread and recess forming operation, in their broad sense, and intend that the said terms include not only a single gradual compression of the metal by punches 18, 26, but also a plurality of repeated hammer strokes of said punches or either of the same. Likewise the preliminary shaping of the metal in the die 12 may be either a repeated hammering operation or a single compression step.

I have illustrated and described my improvements in an embodiment which is very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent, is:

1. The method of forming nuts comprising the steps of placing a preformed annular work blank within a die shaped to correspond to the outline of the finished product, introducing a thread matrix centrally of the die within the annular blank, compressing the blank in a direction axially of the same to cause the metal thereof to flow radially against the matrix and die, simultaneously forming recesses in the blank extending axially thereof, rotating the matrix to free the same from the nut threads, and removing the finished nut from the die.

2. The method of forming nuts comprising the steps of placing a preformed annular work blank within a die shaped to correspond to the outline of the finished product, introducing a thread matrix centrally of the die within the annular blank, compressing the blank in a direction axially of the same to cause the metal thereof to flow radially against the matrix and die, rotating the matrix to free the same from the nut threads, and removing the finished nut from the die.

3. The method of forming nuts comprising the steps of placing a preformed annular work blank within a die shaped to correspond to the outline of the finished product, introducing a thread matrix centrally of the die within the annular blank, compressing the blank in a direction axially of the same to cause the metal thereof to flow radially against the matrix and die, simultaneously forming recesses in the blank extending axially thereof, and causing relative movement of the nut and matrix to free the former from the latter.

4. The method of forming nuts comprising the steps of placing a preformed annular blank within a die shaped to conform to the outline of the finished nut, introducing a thread matrix centrally of the die within the blank, compressing the blank in a direction axially of the same to cause the metal thereof to flow radially against the matrix and die, and imparting relative rotation to the nut and matrix to remove the nut from the latter.

5. The method of forming nuts comprising the steps of placing an annular blank around a thread matrix, compressing the blank axially to cause the material thereof to flow radially against the matrix, and rotating the matrix to free the same from the threads formed in the nut.

6. The method of forming nuts comprising the steps of placing an annular blank around a thread matrix, and compressing the blank axially to cause the material thereof to flow radially against the matrix.

7. The method of forming nuts comprising the steps of forming an annular blank from a length of rod stock with a tongue and groove connection at the ends of the length, inserting the annular blank in a die having an outline corresponding to the shape of the finished nut, inserting a threaded matrix in the blank centrally of the die, and compressing the blank axially thereof simultaneously to cause the metal thereof to flow radially against the matrix and die, and to distort the metal adjacent said connection, thereby integrally uniting the blank ends.

8. The method of forming nuts comprising the steps of placing an annular blank in a die and in encircling relation to a thread matrix disposed within the die, and radially displacing such portion of the metal of the blank as is necessary to force the same into conforming relation to the die and to the thread matrix by forcing an annular series of swaging elements into both end faces of the blank and at points radially intermediate the inner and outer surfaces of the blank and of the finished work.

9. The method of forming nuts comprising the steps of placing an annular blank in a die shaped to correspond to the peripheral outline of the finished product and in encircling relation to a thread matrix disposed centrally within the die, and displacing the metal of the blank radially within the die by a recess-forming swaging in an end face of the blank, and disengaging the formed nut and matrix thread by a relative rotary and retracting movement thereof.

10. The method of forming nuts comprising the steps of placing an annular work blank within a die and in encircling relation to thread matrix, and displacing substantial portions of the metal of the blank radially to conform the blank to the thread matrix and to the die by recess producing swaging forces directed axially into an end of the die.

11. In a machine for forming a nut, a die, a swaging member reciprocably mounted relative to said die and to a preformed annular blank therein to cause the material of the blank to flow radially, a thread forming member reciprocable and rotatable relative to said swaging member and insertable in said blank, means for reciprocating said swaging member relative to the thread forming member and against the blank, and means for rotating said thread forming member to free the same from the threads formed in the blank thereby.

12. In a machine for forming a nut, a die, a compressor member reciprocably mounted relative to said die and to a preformed annular blank therein to cause the material of the blank to flow radially, a thread forming member rotatable relative to said die and insertable in said blank, means for reciprocating said compressor member relative to the thread forming member and against the blank, and means for rotating said thread forming member to free the same from the threads formed in the blank thereby.

13. A method of forming threaded elements comprising the steps of positioning a blank relative to a thread forming matrix, compressing the blank longitudinally to cause the metal thereof to flow laterally against the matrix, and relatively rotating the blank and matrix to free the same from one another.

14. A machine for forming nuts comprising a stationary die shaped to correspond to the finished outline of the nuts, a swaging member slidingly mounted in said die, said swaging member having projections thereon adapted to compress the metal of a block in said die, a rod reciprocable in said swaging member centrally thereof and having a matrix thread thereon cooperable with the blank, a further reciprocable swaging member cooperating with said first member to compress a blank in the die and shape the same to finished form, means for rotating the rod to clear the matrix thread thereon from the thread formed thereby in the blank, and means for reciprocating said rod to position the same relative to the blank.

15. A machine for forming nuts comprising a die shaped to conform to the finished outline of the nuts, a compressor member slidingly mounted relative to said die, a rod reciprocable in said compressor member centrally thereof and having a matrix thread thereon cooperable with a blank inserted in the die, means for rotating the rod to clear the matrix thread thereon from the thread formed thereby in the blank, and means for reciprocating said rod to position the same relative to the blank.

16. The method of forming nuts comprising the steps of forming an annular blank from rod stock, uniting the ends of the stock by a tongue and groove connection, hammering said blank axially of the same while confining the blank in a die to preliminarily shape the blank, and subsequently compressing the partially formed blank against a thread matrix disposed concentrically thereof to simultaneously form axially extending recesses and an internal thread therein, the metal of the blank flowing radially under the compression to provide the recesses and the shape of said thread.

LEONARD A. YOUNG.